United States Patent [19]

Phinney

[11] Patent Number: 4,993,023
[45] Date of Patent: * Feb. 12, 1991

[54] APPARATUS FOR PROVIDING MULTIPLE CONTROLLER INTERFACES TO A STANDARD DIGITAL MODEM AND INCLUDING MULTIPLEXED CONTENTION RESOLUTION

[75] Inventor: Thomas L. Phinney, Boulder City, Nev.

[73] Assignee: Honeywell Inc., Minneapolis, Minn.

[ * ] Notice: The portion of the term of this patent subsequent to Jan. 29, 2008 has been disclaimed.

[21] Appl. No.: 363,842

[22] Filed: Jun. 9, 1989

[51] Int. Cl.⁵ .......................... H04J 3/04; H04B 1/38
[52] U.S. Cl. ................................. 370/85.130; 455/88; 340/825.500
[58] Field of Search ........ 370/85.1, 85.2, 85.12–85.14, 370/85.11; 340/825.5, 825.06; 375/36, 38; 455/4, 88

[56] References Cited

U.S. PATENT DOCUMENTS

4,608,700 8/1986 Kirtley, Jr. et al. .......... 370/85.11 X

Primary Examiner—Benedict V. Safourek
Assistant Examiner—Tesfaldet Bocure
Attorney, Agent, or Firm—A. A. Sapelli; D. J. Lenkszus; A. Medved

[57] ABSTRACT

A communication system which includes a modem and a plurality of controllers has each controller connected to the modem by an interface apparatus, each controller and the modem complying with a predetermined protocol. The interface apparatus comprises a bus which provides a medium to transfer signals between the controllers and the modem. A first interface unit, which interfaces the modem to the bus, implements a modem-associated multi-state state machine and responds to signals on the bus maintaining the predetermined protocol between the modem and the first interface unit. A plurality of second interface units interface a corresponding controller to the bus. Each second interface unit implements a controller-associated multi-state state machine which responds to signals on the bus and further responds to signals from the corresponding controller, each second interface unit maintaining the predetermined protocol between the second interface unit and the corresponding controller. A contention resolution mechanism is multiplexed onto the same bus to resolve contention among the several controllers for access to the single modem.

40 Claims, 4 Drawing Sheets

APPARATUS FOR PROVIDING MULTIPLE CONTROLLER INTERFACES TO A STANDARD DIGITAL MODEM AND INCLUDING MULTIPLEXED CONTENTION RESOLUTION

RELATED PATENT APPLICATION

The present patent application is related to U.S. patent application, Ser. No. 07/363,844, entitled "APPARATUS FOR PROVIDING MULTIPLE CONTROLLER INTERFACES TO A STANDARD DIGITAL MODEM AND INCLUDING SEPARATE CONTENTION RESOLUTION," by T. Phinney, and to U.S. patent application, Ser. No. 07/363,944, entitled "APPARATUS FOR PROVIDING MULTIPLE CONTROLLER INTERFACES TO A STANDARD DIGITAL MODEM AND INCLUDING INTEGRAL CONFLICT RESOLUTION," by T. Phinney, both applications filed on even date herewith, and assigned to Honeywell Inc., the assignee of the present invention.

BACKGROUND OF THE INVENTION

This invention relates to a digital interface apparatus, and more particularly, to an apparatus for providing multiple controller interfaces to a standard digital modem, and includes a multiplexed method of resolving contention among the connected controllers.

In present communication systems utilizing a bus approach, which in particular conforms to IEEE standard 802.4-1989 section 10 (which is now also ISO DIS 8802/4 section 10-(1988)), each controller interfaces with a modem. In particular, controllers of the aforementioned communication systems could not share modems. Each controller interfaced with its corresponding modem.

Therefore, because of the relatively high cost of the modem, there is a need to reduce the number of modems employed in a communication system using the IEEE 802.4 standard. There is provided by the present invention an apparatus which permits multiple (token bus) controllers of the aforementioned communication systems to share a single modem. Further since the modem itself has an analog connection to a medium, there is created certain loads on the medium in terms of energy loading on the bus so that for a given system there is a limited number of ports for connecting the analog modem. By being able to share one analog modem across many digital controllers, there is effectively a multiplier placed in the system of how many devices can be connected. Without having to put repeaters in the analog line, a system is thereby created in which each analog port interfaces many digital controllers by sharing the modem.

A further feature of the present invention reduces the need to have fiber optic or coax cables to connect each device on the bus to every other device on the bus. In the present invention, because these signals are in the form of digital signals, printed wiring backplane or conventional multi-conductor ribbon cable and their associated connectors can be used for devices or modules within close proximity rather than having to utilize specialized fiber optic or coax connectors, and fiber optic or coax cables, respectively. Furthermore, the modem serves to isolate the devices or modules so that they can communicate with each other despite the presence of disabling faults elsewhere in the communications system. Also, for equipment within close proximity, the modems can be eliminated entirely (with a very minor modification), thereby reducing the cost, and still permitting the equipment to have the same interface as if the equipment were communicating remotely.

SUMMARY OF THE INVENTION

Therefore, in a communication system utilizing the IEEE 802.4 standard, there is provided by the present invention, an apparatus for providing an interface between multiple controllers and a single modem. The communication system which utilizes the present invention has a modem which provides a link to remote modems, each modem being connected by a common medium. The communication system further has a plurality of controllers, each controller connected to the modem via an interface apparatus. The modem and the controllers comply with a predetermined protocol. The interface apparatus of the present invention comprises a bus which provides a local medium to transfer signals between the controllers and the modem. A first interface unit, which interfaces the modem to the bus, implements a modem-associated multi-state state machine and responds to signals on the bus maintaining the predetermined protocol between the modem and the first interface unit. A plurality of second interface units interface a corresponding controller to the bus. Each second interface unit implements a controller-associated multi-state state machine which responds to signals on the bus and further responds to signals from the corresponding controller, each second interface unit maintaining the predetermined protocol between the second interface unit and the corresponding controller.

Accordingly, it is an object of the present invention to provide an apparatus which permits multiple controllers to share a single modem.

It is another object of the present invention to provide an apparatus which permits an increase in the number of devices that can be put on a given system without affecting the analog loading of a medium, and therefore the medium structure.

These and other objects of the present invention will become more apparent when taken in conjunction with the following description and attached drawings, wherein like characters indicate like parts, and which drawings form a part of the present application.

DETAILED DESCRIPTION

Figure 1:
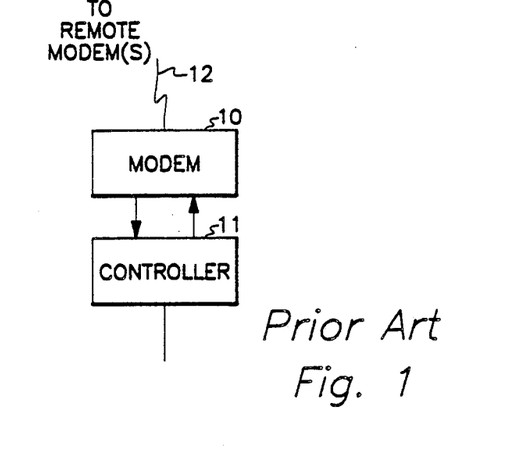
FIG. 1, shows a block diagram of a partial communication system of the prior art.

Referring to FIG. 1, there is shown a block diagram of a prior art, partial 802.4 communication system that has a single modem 10 and a single controller 11, one to one, and that there are signals that go from the controller 11 to the modem 10, and separate signals that go from the modem 10 to the controller 11.

Figure 2:
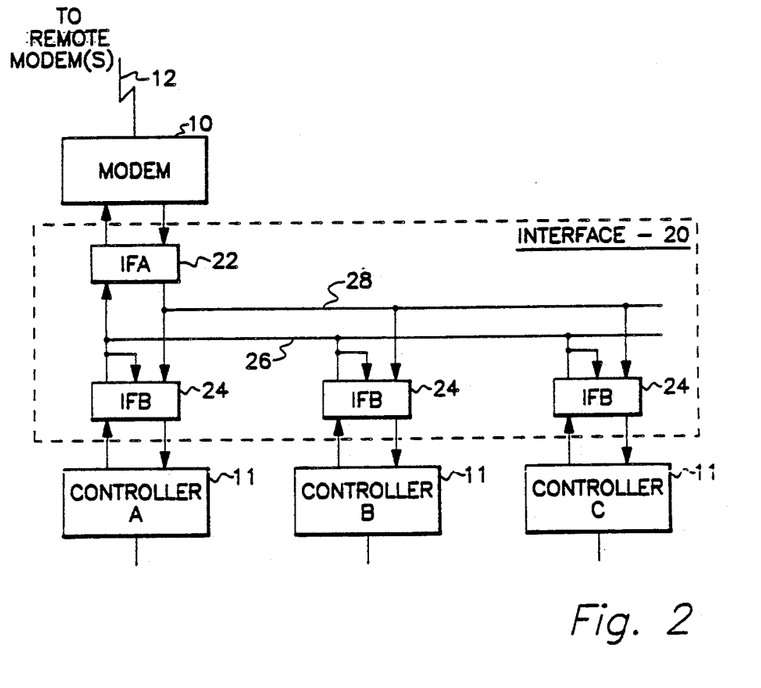
FIG. 2, shows a block diagram of a partial communications system including the apparatus of the present invention permitting multiple controllers to share a single modem.

Referring to FIG. 2, there is shown a block diagram of a partial communication system, including a single modem 10, a plurality of controllers 11, CONTROLLER A, CONTROLLER B, CONTROLLER C, ... Modem 10 is a standard 802.4 compatible modem connected to a medium 12, and controllers 11 are 802.4 compatible token bus controllers 11 being standard components available in the marketplace An apparatus, interface 20, of the present invention includes interface A (IFA) 22 and interface B (IFB) 24, which provides the interface for two (multi-wire wide) buses 26, 28, the first bus 26 being sourced by any or all of the controllers 11, and the other (second bus 28) being sourced by the modem 10. Therefore, there are two networks 26, 28 which replace the two sets of point-to-point lines of the prior art modem-controller pairing of the 802.4 system of FIG. 1. Network 28 is unidirectional; network 26 is unidirectional with respect to interface A 22 but is bidirectional with respect to interface B 24. Instead of one-to-one modem controller pairing, there is provided by the apparatus of the present invention, an N-to-1 (and N-to-N) network 26, and a 1-to-N network 28, having N-controllers and one modem.

The logic of IFB 24 goes on the controller side of the networks (i.e., pair of networks) 26, 28, and the logic of IFA 22 goes on the modem side of this pair of networks 26, 28, such that the controller 11 will only see valid signals (i.e., signals that are valid according to the 802.4 standard), and such that the modem 10 will only see signals that are valid according to the 802.4 standard. Any controller 11 and any modem 10 that meets this standard (i.e., the 802.4 standard, and in particular the interface specification of section 10 (1989)) will operate correctly in the "sharing" configuration of the system of FIG. 2 with the interface 20.

The IEEE Standard 802.4 contains constraints on the interface between the controller 11 and the modem 10. Some of these constraints are electrical constraints, which include setup and hold times, voltage levels, ... Other constraints are logical or functional such as a set of legitimate symbol signalling sequences.

Figure 3:
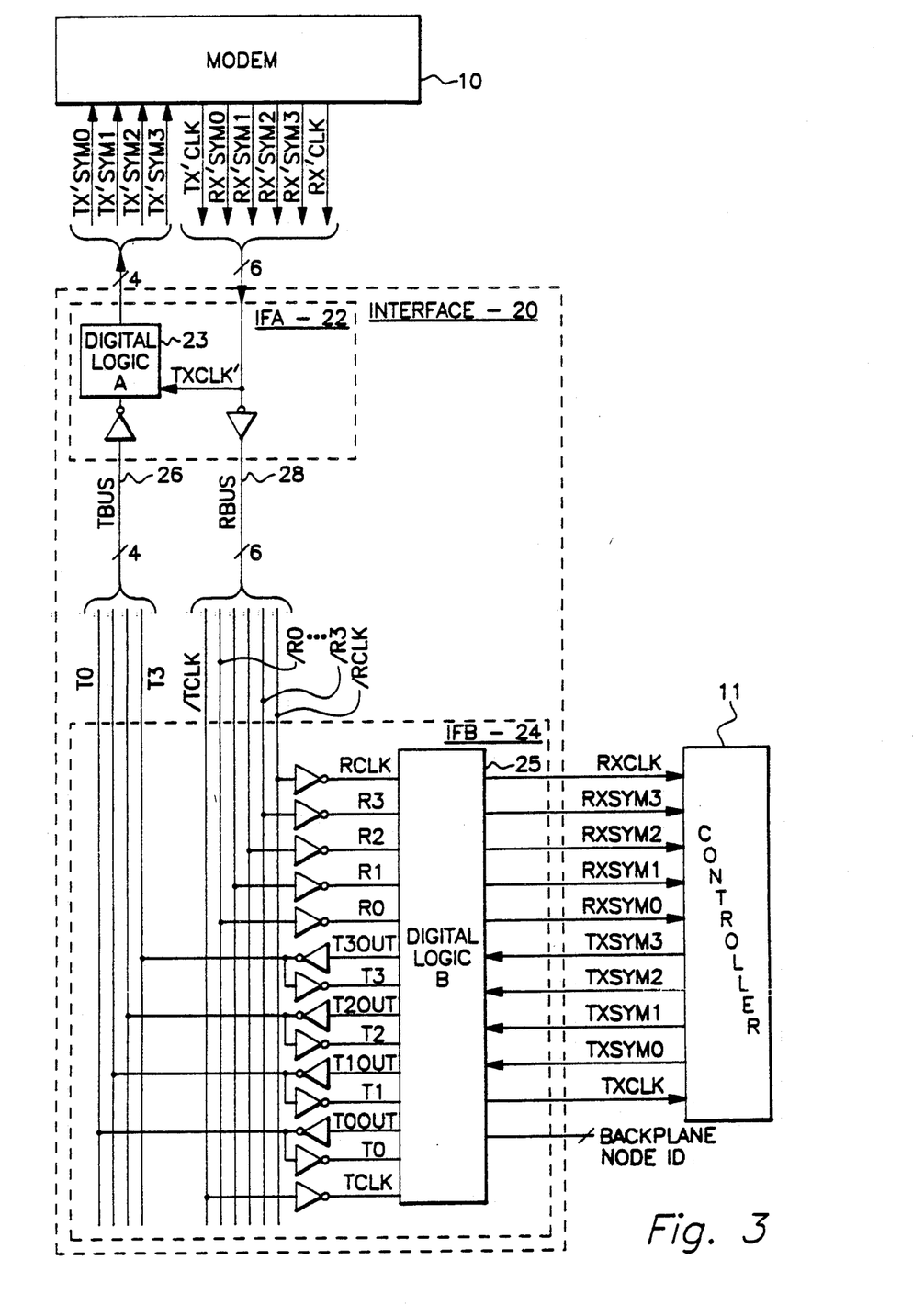
FIG. 3 shows a functional diagram of the networks coupled to the apparatus of the preferred embodiment of the present invention.

Referring to FIG. 3 there is shown a functional diagram of the networks and the coupling with interface 20. The interface has essentially a transmit side and a receive side, each of which has four parallel data lines that provides a multi-bit wide symbol, one of sixteen symbols on the interface in each direction. There are four data lines plus two clock lines from the modem 10, and there are four data lines going to the modem 10, and thus going to and from interface IFA 22, from and to the networks 6, 28, respectively. Referring to FIG. 3, the symbols shown in FIG. 3 between IFB 24 and the controller 11 are the symbols used in the standard. The symbols shown in FIG. 3 coupled to interface IFB 24 from the networks 26, 28 are related names/symbols because the signals on the networks 26, 8 (sometimes referred to herein as bus 26, 28) are slightly different than those of the standard. (The signals on the bus 26, 28 are modified by the logic IFA 22 and IFB 24 such that the modem 10 and the controller 11 only see the standard signals and signalling sequences). Also shown is digital logic A 3 of IFA 22 and digital logic B 25 of IFB 24, which will be described in further detail hereinunder.

The symbols referred to above are defined in table 1, which are basically derived from the 802.4 standard symbols, standing for silence, data, bad signal, preamble, ... For example, for a preamble symbol the state of the transmit lines is, TXSYM3 is a (logic) one, TXSYM2 is a zero, TXSYM1 is a logic one, and TXSYM0 is a "don't care" (x=don't care). This symbol is defined in the 802.4 standard (pad idle) and having the letter code P.

TABLE 1

| Symbol | Signal | Transmit (T) or Receive (R) | SYM Bit State | | | |
|--------|--------|------------------------------|---|---|---|---|
|        |        |                              | 3 | 2 | 1 | 0 |
| S | silence | T/R | 1 | 1 | 1 | X |
| D | data (0) | T/R | 1 | 0 | 0 | 0 |
| D | data (1) | T/R | 1 | 0 | 0 | 1 |
| B | bad_signal | R only | 1 | 0 | 1 | X |
| P | preamble | T only | 1 | 0 | 1 | X |
| N | non_data | T/R | 1 | 1 | 0 | X |
| M | modem control | T/R | 0 | X | X | X |

Regular expression (1) describes the constraints which the IEEE standard places on transmissions from the controller 11 to (and through) the modem 10 to the medium 12. The sequence requirements are the sequences on the 4-bit parallel TXSYM lines (bits 3–0) between IFA 22 and modem 10, and between controller 11 and IFB 24. When the controller 11 communicates directly to the modem (for modem control), only modem-control signals are transmitted following the constraints described by expression (2).

$$S^{\geq 1} [(P^8)^{\geq 1} [(NND)^2 D^2] (D^8)^{\geq 0} [(NND)^2 D^2]^{1-2}]^{\geq 1} P^{\geq 0} S \quad (1)$$

$$S^{\geq 1} [M^Q]^{\geq 1} S \quad (2)$$

Essentially, expression (1) indicates that the transmissions from the controller 11 to the modem 10 have one or more S symbols followed by the expression in the brackets one or more times, followed by zero or more P symbols, followed by an S symbol. The expression in the brackets, referred to in the IEEE standard as a "frame", consists first of bytes of preamble (a bit of preamble is a P so a byte of preamble is 8 Ps), thus multiples of 8 P symbols. The bracket $$[(NND)^2 D^2]$$

includes non-data, non-data, data, non-data, non-data, data, data, data, and is referred to as a frame delimiter. Then data bytes follow (i.e., multiple of 8 data symbols), and to end or abort the frame, another one or two frame delimiters, respectively.

The interface A, IFA, 22 including digital logic A 23, and interface B, IFB, 24 including digital logic B 25, insure that the sequence requirement, if met by the individual controllers 11, will be met by the interface 20, which allows multiple controllers to share a modem. A preamble, frame delimiter (or more simply delimiter), data, and delimiter is a frame. A transmission consists of one or more frames back to back, optionally terminated by some amount of preamble (employed here as a postamble). The controllers can be sending data in normal transmission sequences, can be silent expecting to hear data, or can be sending modem control signals. When a controller is in a modem control mode sending modem control signals, the controller expects to receive modem control response signals. When the modem detects an internal fault, the modem transmits a response signal indicating a fault condition. The fault response signal goes to all of the attached controllers, whereas modem control response signals only go to the controller in the modem control mode which is stimulating the modem control response signals, because there are two different functions overlaid on the bus, one being normal communications and the other being modem control. The interface 20 meets the requirements of the bus protocol and modem-controller interface protocol of the standard.

Figure 4:
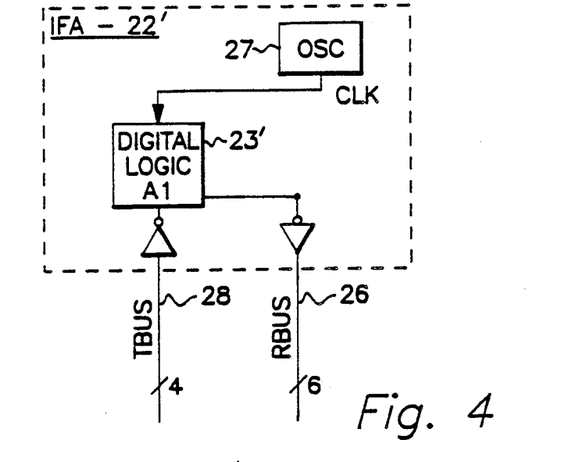
FIG. 4 shows a block diagram of a part of the interface apparatus which eliminates the modem.

Referring to FIG. 4 there is shown a block diagram of the interface A, IFA, 22' which eliminates the modem 10 (i.e., modem eliminator), and thereby substitutes for the modem. The IFA 22' includes digital logic A1 23', which will be discussed further hereinunder, and an oscillator (OSC) 27. Thus, the controllers 11, CONTA, CONTB, CONTC, ... can still communicate with one another even though a modem is not present. Similarly, when a modem is present, but the communications system external to the modem and equipment interconnected by an embodiment of the present invention is malfunctioning, that modem can be commanded to operate in a loopback mode identical to that of the previously described "modem eliminator" 22'.

The digital logic A 23, and the digital logic A1 23', in the preferred embodiment of the present invention, are implemented using programmable logic devices (PLDs). The digital logic B 25, in the preferred embodiment of the present invention is also implemented in PLDs. The digital logic A 23, digital logic A1 23' and digital logic B 25, denoted as Modem Interface Equations, Modem Eliminator Equations, and TBC Interface Equations, respectively, is given in three forms. (TBC denotes token bus controller 11.) The first form, Appendix A, is in terms of parallel symbols, S and T, silence, transmit line, receive line,..... (Reference the Interface Definitions, Appendix B.) The second form is in Symbol-Parallel Logic form, Appendix C, and the third form is in Boolean logic equations which translates directly to the combinatorial logic, Appendix D. For the modem interface $R_i$ is $Rx'Sym_i$ (where $0 \leq i \leq 3$), $Rx'Sym$ being the names from the standard, primed (') to reflect the modem's signals However, on the transmit side $Tx'Sym_i$ is not just $T_i$. It's a (HOLD and $Sl_i$) or ($\overline{HOLD}$ and $T_i$). Thus, the digital logic A 23 normally gates everything through but latches the signal. In one circumstance the signal is latched on a extra bit time or is generated as a combinatorial output. Therefore, for one cycle (one clock time) the signal is not propagated through. For that cycle a pseudo-signal is substituted for the signal.

Figure 5:
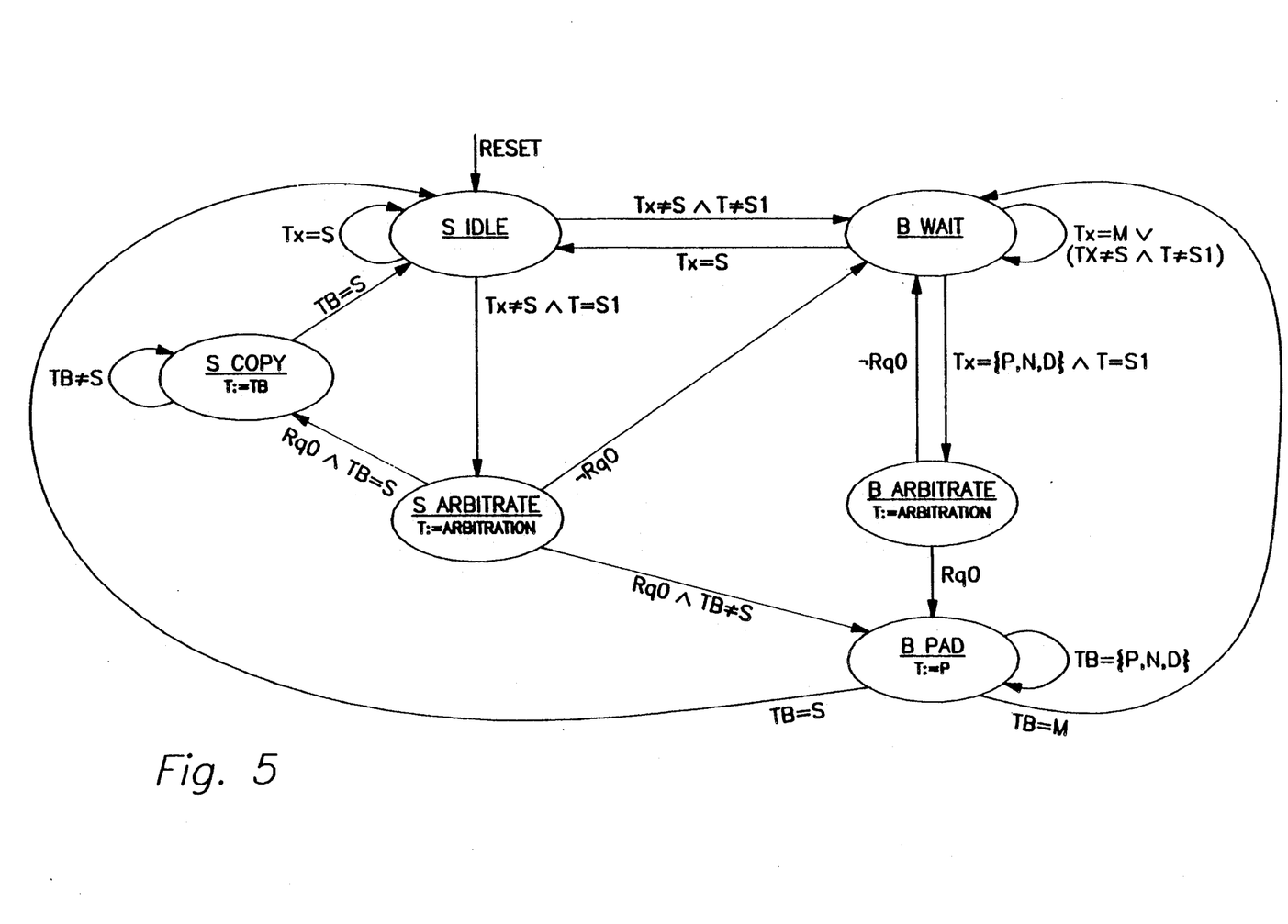
FIG. 5 shows a state diagram of a state machine having six states of the interface apparatus of the preferred embodiment of the present invention.

Referring to FIG. 5, there is shown a state diagram of a state machine having six states which describes the operation of the logic of interface 20, more particularly, digital logic B 25. It can readily be seen by one skilled in the art that digital logic A23 has two states. Table 2 tabulates the states for digital logic B 25 which includes the flow from one state to another with the corresponding exit condition. (In the Tables and Figures, Tx designates the T×Sym outputs of the TBC.)

TABLE 2

| state name | state id | bus driven while in state | next state | exit condition |
|---|---|---|---|---|
| S-idle | 000 | T undriven | 000 | reset |
| | | | 000 | (Tx=S) |
| | | | 001 | (Tx≠S) * (T≠S1) |
| S-arbitrate | 001 | T:=arbitration | 010 | Rqo * (TB=S) |
| | | | 110 | Rqo * (TB≠S) |
| | | | 100 | /Rqo |
| S-copy | 010 | T:=TB | 010 | (TB≠S) |
| | | | 000 | (TB=S) |
| B-wait | 100 | T undriven | 000 | (Tx=S) |
| | | | 100 | (Tx≠S) * (T≠S1) + (Tx=M) |
| | | | 101 | (Tx={P,N,D}) * (T=S1) |
| B-arbitrate | 101 | T:=arbitration | 110 | Rqo |
| | | | 100 | /Rqo |
| B-pad | 110 | T:=P | 110 | (TB={P,N,D}) |
| | | | 000 | (TB=S) |
| | | | 100 | (TB=M) |

Basically, when a station (i.e., controller) tries to transmit, the logic of interface 20, more specifically, IFB 24, senses the state of the bus (TBUS 26). If the bus 26 is idle indicating that there are not transmissions from any of the controllers 11, the logic of IFB 24 tries to claim the bus by going through two cycles. The first cycle is an arbitration cycle. Interface logic 22 detects that the bus is not idle and ignores the state of the bus for one cycle (i.e., one clock time). The interface logic 24 goes through successive states of idle (the bus is idle), to arbitrating the bus, to copying symbols from the controller 11 to the bus 26. If the interface logic IFB, 24 determines the bus is busy (another controller is communicating on the bus), the logic goes into a wait state. Thus, the logic IFB is defined by six states as indicated in Table 2 and FIG. 5. A description of the six states is as follows:

(a) S-idle—If the TBC starts to transmit and the T bus is inactive, then the T bus will be requested and arbitrated, and on winning, the TBC's symbols will be sent to the modem. If the TBC starts to transmit and the T bus is already active, then the interface will wait for the TBC to send an S or for an opportunity to arbitrate and send P symbols to reflect the TBC's activity.

(b) S-arbitrate—The T bus is arbitrated. On winning, the TBC's symbols will be sent to the modem. On losing, the interface will stop driving the T bus and will wait for the TBC to send an S or for an opportunity to arbitrate and send P symbols to reflect the TBC's activity.

(c) S-copy—The TBC's symbols up through the first S are sent to the modem.

(d) B-wait—If the TBC is transmitting P, N, or D symbols and the T bus goes inactive, then the T bus will be requested and arbitrated; on winning, P symbols will be sent to the modem to reflect the TBC's activity.

(e) B-arbitrate—The T bus is arbitrated. On winning, P symbols will be sent to the modem. On losing, the interface will stop driving the T bus and will wait for the TBC to send an S or for an opportunity to arbitrate and send P symbols to reflect the TBC's activity.

(f) B-pad—P symbols are sent to the modem, while the TBC sends P, N, or D symbols, to reflect the TBC's activity. Combinatorial logic determines the symbol reported to the TBC on its RxSym lines. A holding register (not shown), clocked out of phase with the TBC, provides stable outputs to meet the setup and hold time requirements of the TBC. Two registers (TA and TB, no-t shown) connected in tandem, clocked in phase with the TBC and out of phase with the modem, maximize the time that stable outputs are presented to the combinatorial logic which arbitrates and drives the T bus. At the modem, a holding register (not shown) is clocked out of phase with the modem clock to provide stable outputs meeting the modem's setup and hold time requirements. Arbitration within interface 20 occurs using the same lines as that of the bus 26, 28, and can be any standard parallel-bus arbitration scheme well known in the art, and will not be discussed further herein.

The operation of the preferred embodiment of the communication system of FIGS. 2, 3 of the modem-sharing bus with multiplexed bus contention will now be described. The system is a multi-drop extension of the recommended modem—controller interface of IEEE 802.4-1989, Section 10, also known as 802.4G, and IEEE being the Institute of Electrical and Electronics Engineers, Inc. In multi-drop form, that interface is composed of an R bus for the clock and data symbols received from the modem, and a T bus for transmitting the data symbols to the modem, and for resolving contention among the multiple controllers for the T bus and its modem.

Since the R bus is driven from a single point and conveys clocks as well as data symbols, and since the chosen bus drivers and receivers are inverters, the R bus is an active-low bus. Since the T bus has multiple sources, and goes to a high state when undriven, and since the modem must be presented with the symbol S (silence) in such cases, the T bus is defined as an active-high bus. To provide the necessary setup and hold times for the TBC and modem, the modem-supplied transmit and receive clock (Tx'Clk and Rx'Clk in FIG. 3) are inverted before presentation to the TBC (as TxClk and RxClk).

The bus control logic tracks the T bus. T bus contention occurs when the T bus is idle (S1) and one or more TBCs are sourcing P, N or D symbols. If the T bus was idle when the TBC that won the contention began sourcing the P, N or D symbols, then that TBC is directly connected to the T bus. Otherwise P symbols are sent on the T bus until the winning TBC goes silent.

T bus contention also occurs when the T bus is idle and one or more TBCs begin sourcing M symbols. The winning TBC is directly connected to the T bus. With respect to the T bus, the output from a losing TBC, or from a TBC which had begun an M-symbol sequence while the T bus was active, is ignored until that TBC goes silent. The T bus is undriven when the TBC is sending S symbols; the undriven T bus goes to the S1 (=1111) state. A driven T bus does not assume the S1 state.

Received M symbols are reported to the TBC when R=PLE (=0111) or when the TBC is sourcing M symbols on its T×Sym lines. When the TBC is sourcing M symbols and it is not enabled on the T bus, then the bus control logic reports NAK (=010x) M-symbols on the R×Sym lines. At other times when the bus control logic receives M symbols on the R bus, it reports B symbols on the R×Sym lines. In all other cases, the bus control logic reports the received non-M symbols on the RxSym lines.

When the T bus state is S1 (=1111), the bus control logic may try to claim the T bus. This is accomplished by using the T bus for a FastBus-like parallel arbitration cycle (well-known in the art as IEEE standard 960), which resolves before the next T×Clk, i.e., the arbitration is completed in one TClk period. If it wins the arbitration, then the bus control logic supplies data directly to the T bus as specified above. The FastBus-like parallel arbitration is more fully described in U.S. Pat. No. 3,983,540.

During T bus arbitration cycles the modem receives the symbol S. In all the other cases the modem receives the T bus symbol unaltered. A modem eliminator returns ACK (=001x) when presented with parallel station management commands, NAK (=010x) when presented with serial station management commands, converts P Symbols to D Symbols, and loops back all other commands unaltered. When the modem is in a loopback mode, the controller expects to see each transmitted symbol fully echoed, except that P symbols are converted to D symbols by the modem, and M symbols are echoed as either ACK(=001x) or NAK(=010x) M-symbols. The IEEE 802.4 standard specifies that the maximum permitted delay in this echoing processes of the controller-to-modem and modem-to-controller connection is 6.4 microseconds. Also, although reference has been made to a modem, it will be understood by those skilled in the art that a single port of a repeater in which the port has an interface similar to that of the modem compatible with the IEEE Standard 802.4 may be substituted.

Referring to Table 3, there is defined an alternative embodiment of IFA 22, which has three (3) states, and IFB 24, which has a 3-state T-state machine and a 3-state F-state machine. The arbitration can take N-clock periods where the F-state machine includes an $N+1$ deep FIFO (or pipeline).

TABLE 3A

| | | IFA STATE MACHINE | | | |
|---|---|---|---|---|---|
| state name | state id | Tx bus source while in state | next state | exit condition | action taken on transition |
| A-idle | 00 | Tx:=S1 | 00 | reset | |
| | | | 00 | (T-inactive) | |
| | | | 01 | (T-active) | c:=max |
| A-wait | 01 | Tx:=S1 | 01 | (c≠0) | c:=c-1 |
| | | | 10 | (c=0) | |
| A-pass | 10 | Tx:=T bus | 00 | (T-inactive) | |
| | | | 10 | (T-active) | |

A description of the states of Table 3 is as follows:

A-idle—The T bus is idle; silence is reported to the modem.

A-wait—The T bus is being used for arbitration; silence is reported to the modem.

A-pass—The T bus is being used to connect a single TBC to the modem.

TABLE 3B

| | | IFB'S FIFO-ASSESSMENT STATE MACHINE | | |
|---|---|---|---|---|
| state name | state id | exit condition | next state | action taken on transition |
| | | reset | 00 | iF:=max |
| F-empty | 00 | (Tx=S) | 00 | iF:=max |
| | | (Tx≠S) | 01 | iF:=iF-1; iL:=max |
| F-active | 01 | (Tx=S) * (iL=0) | 00 | iF:=max |

TABLE 3B-continued

IFB'S FIFO-ASSESSMENT STATE MACHINE

| state name | state id | exit condition | next state | action taken on transition |
|---|---|---|---|---|
| F-overrun | 10 | $(Tx \ne S) * (iF \ne 0)$ | 01 | iF:=iF-1; iL:=max |
| | | $(Tx = S) * (iF \ne 0)$ | 01 | iF:=iF-1; iL:=iL-1 |
| | | $(Tx \ne S) * (iF = 0)$ | 10 | iL:=max |
| | | $(Tx = S) * (iF = 0) * (iL \ne 0)$ | 10 | iL:=iL-1 |
| | | $(Tx = S) * (iL = 0)$ | 00 | iF:=max |
| | | $(Tx = S) * (iL \ne 0)$ | 10 | iL:=iL-1 |
| | | $(Tx \ne S)$ | 10 | iL:=max |

TABLE 3C

IFB MASTER STATE MACHINE
(Multi-step Arbitration, Single Clock Cycle per Step)

| state name | state id | bus driven while in state | next state | exit condition | action taken on transition |
|---|---|---|---|---|---|
| T-idle | 00 | T undriven | 00 | reset | |
| | | | 00 | (T-active)+ F-empty | |
| | | | 01 | (T-inactive) * /F-empty | |
| T-arbitrate | 01 | T:=arbitrate(c) | 00 | /won + F-empty | c:=max |
| | | | 01 | $(c \ne 0)$ * won * /F-empty | c:=c-1 |
| | | | 10 | (c=0) * won * F-active | T_source is TxFIFO$_{[max]}$ |
| | | | 10 | (c=0) * won * F-overrun | T_source is P |
| T-source | 10 | T:=T_source | 00 | F-empty | |
| | | | 10 | /F-3mpty | |

A description of the states of Tables 3B and 3C is as follows:

F-empty—The T×FIFO which holds symbols transmitted by the controller is logically empty—it contains only S (silence) symbols.

F-active—The T×FIFO contains one or more non-silence (S) symbols and has not yet overflowed.

F-overrun—The T×FIFO contains one or more non-silence (S) symbols and has overflowed.

T-idle—If the TBC starts to transmit and the T bus is inactive, then the T bus will be arbitrated, and on winning, the TBC's symbols will be sent to the modem and the T bus will remain driven. If the TBC starts to transmit and the T bus is already active, then the interface will wait for the TBC to cease transmission or for the T bus to go inactive.

T-arbitrate—The T bus is arbitrated. On losing an arbitration cycle, the interface will stop driving the T bus and will return to the T-idle state. On winning an arbitration cycle, the interface will participate in the next round of arbitration. On winning the last arbitration cycle, the T bus will remain driven and either the TBC's symbols, or P symbols indicating TBC activity, will be sent to the modem.

Upon winning the multi-cycle arbitration, the decision is made either to source the TxFIFO output to the T bus (the usual case), or to source P symbols to the T bus (reflecting TBC activity after the initial part of the TBC's transmission was lost due to conflicting prior T-bus activity).

T-source—Either the TBC's symbols, or P symbols reflecting the continuation of the TBC's already-commenced transmission (the first part of which has been lost due to T×FIFO overflow), are sent to the modem until the TBC transmits a long enough sequence of S symbols to permit the T×FIFO to empty. During this period the T bus remains driven to inhibit re-arbitration by other bus-connected devices.

Table 4 shows a state table for an IFB 24 for single-or Multi-step arbitration having multiple clock cycles per step. A description of the states of the IFB 24 of Table 4 is as follows:

T-idle—If the TBC starts to transmit and the T bus is inactive, then the T bus will be arbitrated, and on winning, the TBC's symbols will be sent to the modem on the T bus, which will remain driven. If the TBC starts to transmit and the T bus is already active, then the interface will wait for the TBC to cease transmission or for the T bus to go inactive.

T-arbitrate—The T bus is arbitrated. On losing an arbitration cycle, the interface will stop driving the T bus and will sequence to the wait state. On winning an arbitration cycle, the interface will participate in the next round of arbitration. On winning the last arbitration cycle, if the T×FIFO is non-empty, then the T bus will remain driven and either the TBC's symbols, or P symbols indicating TBC activity, will be sent to the modem via the T bus; if the T×FIFO is empty, then the interface will simply return to the idle state.

Upon winning the multi-cycle arbitration, the decision is made either to source the T×FIFO output to the T bus (the usual case), or to source P symbols to the T bus (reflecting TBC activity after the initial part of the TBC's transmission was lost due to conflicting prior T-bus activity).

T-source—Either the TBC's symbols, or P symbols reflecting the continuation of the TBC's already-commenced transmission (the first part of which has been lost due to T×FIFO overflow), are sent to the modem until the TBC transmits a long enough sequence of S symbols to permit the T×FIFO to empty.

T-sync—At power-up or reset, the interface synchronizes with the T bus by waiting for a period of continuous inactivity on the T bus equal in length to a full contention cycle. After such a period of inactivity has been observed (which the IEEE 802.4 protocol guarantees will eventually occur), the interface sequences to the idle state.

T-wait—This state is used to sequence through the remainder of an arbitration cycle either after the interface loses a phase of the arbitration cycle, or after the interface observes T bus activity indicating that companion interfaces have begun an arbitration cycle.

Figure 6:
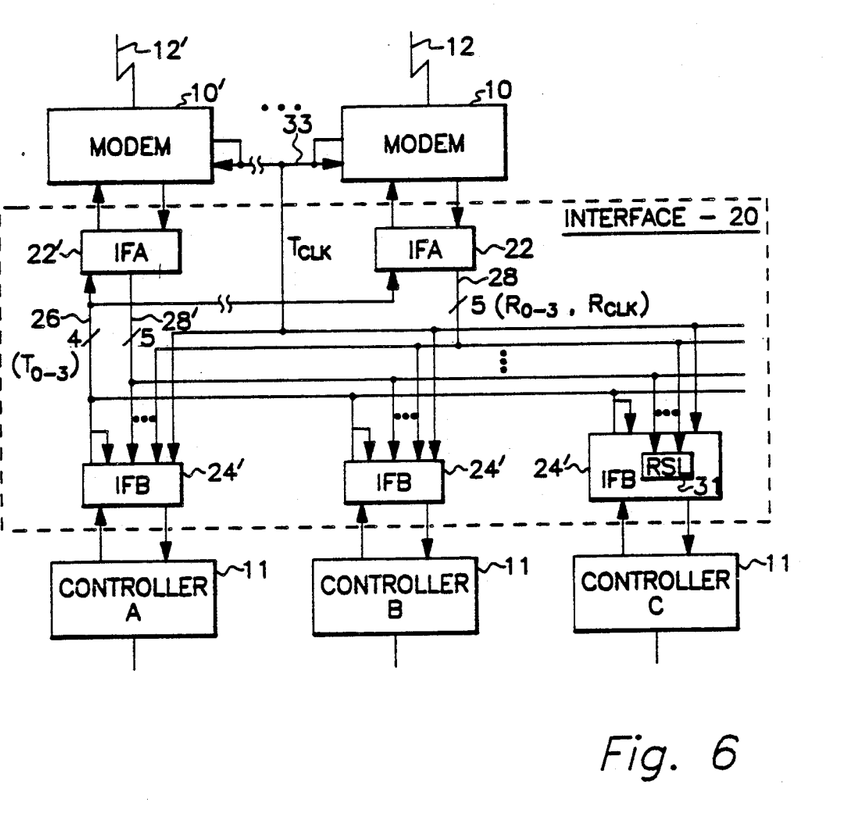
FIG. 6 shows a block diagram of an alternative embodiment of the present invention which includes a plurality of modems.

T-busy—This state is used to await the release of the T bus by another interface which has won the last arbitration cycle and is currently in the message transmission phase, using the T bus to communicate with the modem.

time. Generally, modems meeting the standard include a locally originated transmit clock. In the embodiment of FIG. 6, a single TClk line 33 is shown. The exact implementation of TClk generation is not relevant to the present invention and will not be discussed further;

TABLE 4
IFB MASTER STATE MACHINE
(Single- or Multi-step Arbitration, Multiple Clock Cycles Per Step)

| state name | state id | bus driven while in state | next state | exit condition | action taken on transition |
|---|---|---|---|---|---|
| T-idle | 000 | T undriven | 100 | reset | |
| | | | 000 | (T-inactive) * F-empty | |
| | | | 001 | (T-inactive) * /F-empty | $c := max$ |
| | | | 101 | (T-active) | $c := c-1$ |
| T-arbitrate | 001 | T:=arbitrate(c) | 101 | $(c \neq 0)$ * (/won + F-empty) | $c := c-1$ |
| | | | 110 | $(c=0)$ * (/won + F-empty) | |
| | | | 001 | $(c \neq 0)$ * won * /F-empty | $c := c-1$ |
| | | | 010 | $(c=0)$ * won * F-active | T_source is TxFIFO$_{[max]}$ |
| | | | 010 | $(c=0)$ * won * F-overrun | T_source is P |
| T-source | 010 | T:=T_source | 000 | F-empty | |
| | | | 010 | /F-empty | |
| T-sync | 100 | T undriven | 100 | (T-active) | $c := max$ |
| | | | 100 | (T-inactive) * $(c \neq 0)$ | $c := c-1$ |
| | | | 000 | (T-inactive) * $(c=0)$ | |
| T-wait | 101 | T undriven | 101 | $(c \neq 0)$ | $c := c-1$ |
| | | | 110 | $(c=0)$ | |
| T-busy | 110 | T undriven | 000 | (T-inactive) * F-empty | |
| | | | 001 | (Tinactive) * /F-empty | $c := max$ |
| | | | 110 | (T-active) | |

From the state table of the alternative embodiments, the Boolean Logic equations, the interface definitions, and the symbol-parallel logic forms can be readily generated by those skilled in the art and will not be described further.

Referring to FIG. 6, there is shown an alternative embodiment of the present invention, a plurality of modems 10 (including a corresponding IFA 22), each having a single independent receiver, is each connected to a corresponding receive bus 28. Each receive bus is connected to a second plurality of controllers 11 via a corresponding IFB 24'. Each IFB 24' includes receiver selection logic (RSL) 31, such that received symbols are presented to the IFB 24' from only one modem at a however, it is to be noted that some method of providing all of the modems 10 with a single common TClk must be employed, a variety of methods being generally well known in the art.

While there has been shown what is considered the preferred embodiment of the present invention, it will be manifest that many changes and modifications can be made therein without departing from the essential spirit and scope of the invention, specifically including bus arbitration methods utilizing other parallel arbitration techniques. It is intended, therefore, in the annexed claims to cover all such changes and modifications which fall within the true scope of the invention.

APPENDIX A
Multiplexed Arbitration—Functional Form of the Interfaces

In the following, the subscript i (symbol bit weight) has the range $0 \leq i \leq 3$.
Clocks for registered state data are shown in the right-hand margin.

Modem Interface Equations

| | | | |
|---|---|---|---|
| RClk | := Rx'Clk | —bus clock = modem clock | |
| $R_i$ | := Rx'Sym$_i$ | —bus symbol = modem symbol | |
| TClk | := Tx'Clk | —bus clock = modem clock | |
| Tx'Sym$_i$ | := Hold * S1$_i$ + /Hold * T$_i$ | | ↓ TClk |
| Hold | := T=S1 | | ↓ TClk |

Modem Eliminator Equations

| | | | |
|---|---|---|---|
| RClk | := TClk := local oscillator | | |
| | —T-bus symbol, recoded for loopback on R-bus; IFA loopback output to IFB | | |
| $R_i$ | := Hold * S1$_i$ + /Hold * T$_3$ * (T $\neq$ P) * T$_i$<br>+ /Hold * T$_3$ * (T = P) * D$_i$ + /Hold * /T$_3$ * (T$_2$ + T$_1$) * Ack0$_i$<br>+ /Hold * /T$_3$ * /T$_2$ * /T$_1$ * Nak0$_i$ | | ↓ TClk |
| Hold | := T=S1 | | ↓ TClk |

TBC Interface Equations

| | | | |
|---|---|---|---|
| RxClk | := /RClk | —inverted clock for TBC | |
| | —IFB T-bus state synchronized for R-bus use | | |
| $J_1$ | := I$_1$A | —synchronizer!! | ↑ RClk |
| $J_2$ | := I$_2$ | —synchronizer!! | ↑ RClk |
| | —IFB output to TBC | | |
| RxSym$_i$ | := [J1 * /J2 + /J1 * R2 + (R = PLE)] * R$_i$<br>+ J$_1$ * J$_2$ * (R $\neq$ PLE) *Nak0$_i$ + /J$_1$ * (R < PLE) * B$_i$ | | $\neq$RClk |
| TxClk | := /TClk | —inverted clock for TBC | |
| | —two-stage shift register holding slightly-recoded symbols for possible T-bus transmission | | |
| TA$_i$ | := (TxSym $\neq$ S) * TxSym$_i$ + (TxSym = S) * S0$_i$ | | ↑ TxClk |
| TB$_i$ | := TA$_i$ | | ↑ TxClk |
| | —IFB state | | |
| $I_0$ | := (I$_{1-0}$ = 0) * (Tx $\neq$ S) * [/I$_2$ + Tx$_3$] * (T = S1) | | ↑ TxClk |

APPENDIX A-continued

Multiplexed Arbitration—Functional Form of the Interfaces $I_1$ := $I_0 * Rq_0 + I_1 * (TB \neq S) * [/I_2 + TB_3]$  ↑ TxClk  
$I_1A$ := $I_0 * Rq_0 * /TB_3 + I_1 * /I_2 * /TB_3$  —== glitch-free $I_1 * /TB_3$  ↑ TxClk  
$I_2$ := $(I = 0) * (Tx \neq S) * (T \neq S1) + I_0 * /Rq_0 + I_0*(TB \neq S)$  ↑ TxClk  
  $+ I_2 * /[(I_{1-0} = 0) * (Tx = S) + I_1 * (TB = S)]$  
—IFB output to T-bus  
$Rq_4$ := $I_0$  
$T_{,out}$ := $/I_2 * I_1 * TB_i + I_2 * I_1 * P_i + I_0 * Rq_{i+1} * ID_i$  
$Rq_i$ := $Rq_{i+1} * (ID_i + /T_i)$

APPENDIX B

Interface Definitions

|  | 3210 |  |  |
|---|---|---|---|
| S | = 111x | —silence | Tx & Rx |
| N | = 110x | —non_data | Tx & Rx |
| D d | = 100d | —data d (where d = 0 or 1) | Tx & Rx |
| P | = 101x | —pad_idle (preamble) | Tx only |
| B | = 101x | —bad_signal | Rx only |
| M | = 0xxx | —modem-control signal | Tx & Rx |
| R | = 0111 | —station mgmt reset | Tx only |
| L | = 0101 | —station mgmt disable loopback | Tx only |
| E | = 0011 | —station mgmt enable transmitter | Tx only |
| m d | = 001d | —serial station mgmt data d | Tx only |
| Idle | = 0001 | —station mgmt "mark" (line idle) | Rx only |
| Ack d | = 001d | —station mgmt positive acknowledge, data d | Rx only |
| Nak d | = 010d | —station mgmt negative acknowledge, data d | Rx only |
| PLE | = 0111 | —modem-detected (physical layer) error | Rx only |
| RxClk |  | —rising-edge active, setup = 40% of period, hold = 10 ns |  |
| TxClk |  | —rising-edge active, setup = 35% of period, hold = 5 ns |  |

APPENDIX C

Multiplexed Arbitration—Symbol-Parallel Logical Form of the Interfaces

In the following, the subscript i (symbol bit weight) has the range $0 \leq i \leq 3$.  
Clocks for registered state data are shown in the right-hand margin.

Modem Interface Equations

RClk := Rx'Clk  —bus clock = modem clock  
$R_i$ := Rx'Sym$_i$  —bus symbol = modem symbol  
TClk := Tx'Clk  —bus clock = modem clock  
Tx'Sym$_i$ := Hold 1111$_i$  /Hold T$_i$  ↓ TClk  
Hold := T=1111  ↓ TClk

Modem Eliminator Equations

RClk := TClk := local oscillator  
—T-bus symbol, recoded for loopback on R-bus; IFA loopback output to IFB  
$R_i$ := Hold 1111$_i$  /Hold T$_3$ (T ≠ 101x) T$_i$  ↓ TClk  
  /Hold T$_3$ (T = 101x) 100x$_i$  /Hold /T$_3$ (T$_2$ T$_1$) 0010$_i$  
  /Hold /T$_3$ /T$_2$ /T$_1$ 0100$_i$  
Hold := T=1111  ↓ TClk

TBC Interface Equations

RxClk := /RClk  —inverted clock for TBC  
—IFB T-bus state synchronized for R-bus use  
$J_1$ := $I_1A$  —synchronizer!!  ↑ RClk  
$J_2$ := $I_2$  —synchronizer!!  ↑ RClk  
—IFB output to TBC  
RxSym$_i$ := [$J_1$ /$J_2$  /$J_1$ $R_2$  (R = 0111)] $R_i$  ↑ RClk  
  $J_1$ $J_2$ (R ≠ 0111) 0100$_i$  /$J_1$ (R < 0111) 101x$_i$

---

TxClk := /TClk  —inverted clock for TBC  
—two-stage shift register holding slightly-recoded symbols for possible T-bus transmission  
TA$_i$ := (TxSym ≠ 111x) TxSym$_i$  (TxSym = 111x) 1110$_i$  ↑ TxClk  
TB$_i$ := TA$_i$  ↑ TxClk  
—IFB state  
$I_0$ := ($I_{1-0}$ = 0) (Tx ≠ 111x) (/$I_2$ Tx$_3$) (T = 1111)  ↑ TxClk  
$I_1$ := $I_0$ Rq$_0$  $I_1$ (TB ≠ 111x) (/$I_2$ TB$_3$)  ↑ TxClk  
$I_1A$ := $I_0$ Rq$_0$ /TB$_3$  $I_1$ /$I_2$ /TB$_3$  —== glitch-free $I_1$ /TB$_3$  ↑ TxClk  
$I_2$ := (I = 0) (Tx ≠ 111x) (T ≠ 1111)  ↑ TxClk  
  $I_0$ /Rq$_0$  $I_0$ (TB ≠ 111x)  
  $I_2$ /[($I_{1-0}$ = 0) (Tx = 111x)  $I_1$ (TB = 111x)]  
—IFB output to T-bus  
Rq$_4$ := $I_0$  
T$_{,out}$ := /$I_2$ $I_1$ TB$_i$  $I_2$ $I_1$ 101x$_i$  $I_0$ Rq$_{i+1}$ ID$_i$  
Rq$_i$ := Rq$_{i+1}$ (ID$_i$ /T$_i$)

APPENDIX D

Multiplexed Arbitration—Logical Equation Form of the Interfaces

Modem Interface Equations

Inputs: Tx'Clk, Rx'Clk, Rx'Sym$_3$, Rx'Sym$_2$, Rx'Sym$_1$, Rx'Sym$_0$; /T$_3$, /T$_2$, /T$_1$, /T$_0$
Outputs: TClk, RClk, R$_3$, R$_2$, R$_1$, R$_0$; Tx'Sym$_3$, Tx'Sym$_2$, Tx'Sym$_1$, Tx'Sym$_0$

| | | | |
|---|---|---|---|
| RClk | := Rx'Clk | —bus clock = modem clock | |
| R$_3$ | := Rx'Sym$_3$ | | |
| R$_2$ | := Rx'Sym$_2$ | | |
| R$_1$ | := Rx'Sym$_1$ | | |
| R$_0$ | := Rx'Sym$_0$ | | |
| TClk | := Tx'Clk | —bus clock = modem clock | |
| Tx'Sym$_3$ | := Hold + T$_3$ | | ↓ TxClk |
| Tx'Sym$_2$ | := Hold + T$_2$ | | ↓ TxClk |
| Tx'Sym$_1$ | := Hold + T$_1$ | | ↓ TxClk |
| Tx'Sym$_0$ | := Hold + T$_0$ | | ↓ TxClk |
| Hold | := T$_3$•T$_2$•T$_1$•T$_0$ | | ↓ TxClk |

Modem Eliminator Equations

Inputs: local clock, /T$_3$, /T$_2$, /T$_1$, /T$_0$
Outputs: TClk, RClk, R$_3$, R$_2$, R$_1$, R$_0$

| | | | |
|---|---|---|---|
| RClk | := TClk := local oscillator | | |
| —T-bus symbol, recoded for loopback on R-bus; IFA loopback output to IFB | | | |
| R$_3$ | := Hold + T$_3$ | | ↓ TxClk |
| R$_2$ | := Hold + T$_3$•T$_2$ + /T$_3$•/T$_2$•/T$_1$ | | ↓ TxClk |
| R$_1$ | := Hold + /T$_3$•T$_2$ + T$_1$ | | ↓ TxClk |
| R$_0$ | := Hold + T$_3$•T$_0$ | | ↓ TxClk |
| Hold | := T$_3$•T$_2$•T$_1$•T$_0$ | | ↓ TxClk |

TBC Interface Equations

Inputs: RClk, R$_3$, R$_2$, R$_1$, R$_0$, I$_1$A, I$_2$
Outputs: RxClk, RxSym$_3$, RxSym$_2$, RxSym$_1$, RxSym$_0$

| | | | |
|---|---|---|---|
| RxClk | := /RClk | —inverted clock for TBC | |
| —IFB T-bus state synchronized for R-bus use | | | |
| J$_1$ | := I$_1$A | —synchronizer!! | ↑ RClk |
| J$_2$ | := I$_2$ | —synchronizer!! | ↑ RClk |
| —IFB output to TBC | | | |
| RxSym$_3$ | := J$_1$•/J$_2$•R$_3$ + /J$_1$•R$_3$<br>+ /J$_1$•/R$_3$•/R$_2$ + /J$_1$•R$_3$•/R$_1$ + /J$_1$•/R$_3$•/R$_0$ | | ↑ RClk |
| RxSym$_2$ | := J$_1$•/J$_2$•R$_2$ + /J$_1$•R$_3$•R$_2$ + •/R$_3$•R$_2$•R$_1$•R$_0$<br>+ J$_1$•I$_2$•R$_3$ + J$_1$•I$_2$•/R$_2$ + J$_1$•I$_2$•/R$_1$ + J$_1$•I$_2$•/R$_0$ | | ↑ RClk |
| RxSym$_1$ | := J$_1$•/J$_2$•R$_1$ + /J$_1$•R$_3$•R$_1$ + •/R$_3$•R$_2$•R$_1$•R$_0$<br>+ /J$_1$•/R$_3$•/R$_2$ + /J$_1$•R$_3$•/R$_1$ + /J$_1$•R$_3$•/R$_0$ | | ↑ RClk |
| RxSym$_0$ | := J$_1$•/J$_2$•R$_0$ + /J$_1$•R$_3$•R$_0$ + •/R$_3$•R$_2$•R$_1$•R$_0$ | | ↑ RClk |

Inputs: TClk, /T$_3$, /T$_2$, /T$_1$, /T$_0$, TxSym$_3$, TxSym$_2$, TxSym$_1$, TxSym$_0$
Outputs: TxClk, /T$_3$out, /T$_2$out, /T$_1$out, /T$_0$out, I$_1$A, I$_2$

| | | | |
|---|---|---|---|
| TxClk | := /TClk | —inverted clock for TBC | |
| —two-stage shift register holding slightly-recoded symbols for possible T-bus transmission | | | |
| TA$_3$ | := TxSym$_3$ | | ↑ TxClk |
| TA$_2$ | := TxSym$_2$ | | ↑ TxClk |
| TA$_1$ | := TxSym$_1$ | | ↑ TxClk |
| TA$_0$ | := (/TxSym$_3$ + /TxSym$_2$ + /TxSym$_1$)•TxSym$_0$ | | ↑ TxClk |
| TB$_3$ | := TA$_3$ | | ↑ TxClk |
| TB$_2$ | := TA$_2$ | | ↑ TxClk |
| TB$_1$ | := TA$_1$ | | ↑ TxClk |
| TB$_0$ | := TA$_0$ | | ↑ TxClk |
| —IFB state | | | |
| I$_0$ | := /I$_1$•/I$_0$•(/Tx$_3$ + /Tx$_2$ + /Tx$_1$)•(/I$_2$ + Tx$_3$)•T$_3$•T$_2$•T$_1$•T$_0$ | | ↑ TxClk |
| I$_1$ | := I$_0$•Rq$_1$ + I$_1$•(/TB$_3$ + /TB$_2$ + /TB$_1$)•(/I$_2$ + TB$_3$) | | ↑ TxClk |
| I$_1$A | := I$_0$•Rq$_0$•/TB$_3$ + I$_1$•/I$_2$•/TB$_3$ — = = glitch-free I$_1$•/TB$_3$ | | ↑ TxClk |
| I$_2$ | := /I$_3$•/I$_2$•/I$_1$•/I$_0$•(/Tx$_3$ + /Tx$_2$ + /Tx$_1$)•(/T$_3$ + /T$_2$ + /T$_1$ + /T$_0$)<br>+ I$_0$•/Rq$_0$ + I$_0$•(/TB$_3$ + /TB$_2$ + /TB$_1$)<br>+ I$_2$•/(/I$_1$•/I$_0$•Tx$_3$•Tx$_2$•Tx$_1$ + I$_1$•TB$_3$•TB$_2$•TB$_1$) | | ↑ TxClk |
| —IFB putput to T-bus | | | |
| T$_3$out | := /I$_2$•I$_1$•TB$_3$ + I$_2$•I$_1$ + I$_0$•ID$_3$ | | |
| Rq$_3$ | := I$_0$•ID$_3$ + I$_0$•/T$_3$ | | |
| T$_2$out | := /I$_2$•I$_1$•TB$_2$ + I$_0$•Rq$_3$•ID$_2$ | | |
| Rq$_2$ | := Rq$_3$•ID$_2$ + Rq$_3$•/T$_2$ | | |
| T$_1$out | := /I$_2$•I$_1$•TB$_1$ + I$_2$•I$_1$ + I$_0$ •Rq$_2$•ID$_1$ | | |
| Rq$_1$ | := Rq$_2$•ID$_1$ + Rq$_2$•/T$_1$ | | |
| T$_0$out | := /I$_2$•I$_1$•TB$_0$ + I$_0$•Rq$_1$•ID$_0$ | | |
| Rq$_0$ | := Rq$_1$•ID$_0$ + Rq$_1$•/T$_0$ | | |

I claim:

1. In a communication system, having a modem for providing an interface to a communication link, said communication system further having a plurality of controllers whereby each of said controllers is connected to said modem via an interface apparatus, and further wherein said modem and said controllers comply with a predetermined protocol, said interface apparatus comprising:

(a) bus means, for providing a medium to transfer signals between said controllers and said modem;

(b) first interface means, connected to said bus means, for interfacing said modem to said bus means, said first interface means implementing a modem-associated multi-state state machine which responds to signals on said bus to maintain the predetermined protocol between said modem and said first interface means; and (c) a plurality of second interface means, each of said second interface means being connected to said bus means and to a corresponding controller, for interfacing each of said plurality of controllers to said bus means, each of said second interface means implementing a controller-associated multi-state state machine which responds to signals on said bus means and further responds to signals from the corresponding controller, each of said second interface means maintaining the predetermined protocol between the second interface means and the corresponding controller.

2. An interface apparatus according to claim 1, wherein said first interface means implements a modem-associated multi-state state machine having two states, identified as transmit and hold.

3. An interface apparatus according to claim 2, wherein each of said second interface means implements a controller-associated multi-state state machine having six states, identified as S-idle, S-arbitrate, S-copy, B-wait, B-arbitrate, and B-pad.

4. An interface apparatus according to claim 3, wherein said predetermined protocol is a standard as defined by the IEEE standard 802.4-(1989).

5. An interface apparatus according to claim 1, wherein said first interface means implements a modem-associated multi-state state machine having three states, identified as A-idle, A-wait, and A-pass.

6. An interface apparatus according to claim 5, wherein each of said second interface means implements a first controller-associated multi-state state machine having three states, identified as F-empty, F-active, and F-overrun, cascaded into a second multi-state state machine itself having three states, identified as T-idle, T-arbitrate, and T-source.

7. An interface apparatus according to claim 6, wherein the first and second controller-associated multi-state machines form a third controller-associated multi-state machine having the nine state.

8. An interface apparatus according to claim 5, wherein each of said second interface means implements a first controller-associated multi-state state machine having three states, identified as F-empty, F-active, and F-overrun, cascaded into a fourth multi-state state machine itself having six states, identified as T-idle, T-arbitrate, T-source, T-sync, T-wait, and T-busy.

9. An interface apparatus according to claim 8, wherein the first and second controller-associated multi-state machines form a third controller-associated multistate machine having the eighteen states.

10. In a communication system, having a normal configuration that includes a modem for for interfacing to a communication link and having a backup configuration that eliminates the modem, said communication system further having a plurality of controllers whereby in the normal configuration each of said controllers is connected to said modem via an interface apparats, and further wherein said modem and said controllers comply with a predetermined protocol, said interface apparatus of the backup configuration comprising:
(a) bus means, for providing a medium to transfer signals between said controllers in accordance with the predetermined protocol;
(b) first interface means, connected to said bus means, for simulating a modem, whereby said simulation functions in a local loopback mode; and (c) a plurality of second interface means, each of said second interface means being connected to said bus means and to a corresponding controller, for interfacing each of said plurality of controllers to said bus means, each of said second interface means implementing a controller-associated multi-state state machine which responds to signals on said bus means and further responds to signals from the corresponding controller, each of said second interface means maintaining the predetermined protocol between the second interface means and the corresponding controller, thereby permitting the controllers connected to said bus means to communicate with each other in accordance with the predetermined protocol.

11. An interface apparatus according to claim 10, wherein said first interface means implements a modem-associated multi-state state machine having two states, identified as transmit and hold.

12. An interface apparatus according to claim 11, wherein each of said second interface means implements a controller-associated multi-state state machine having six states, identified as S-idle, S-arbitrate, S-copy, B-wait, B-arbitrate, and B-pad.

13. An interface apparatus according to claim 12, wherein said predetermined protocol is a standard as defined by IEEE standard 802.4-(1989).

14. An interface apparatus according to claim 10, wherein said first interface means implements a modem-associated multi-state state machine having three states, identified as A-idle, A-wait, and A-pass.

15. An interface apparatus according to claim 14, wherein each of said second interface means implements a first controller-associated multi-state state machine having three states, identified as F-empty, F-active, and F-overrun cascaded into a second multi-state state machine itself having the states identified as T-idle, T-arbitrate, and T-source.

16. An interface apparatus according to claim 15, wherein the first and second controller-associated multi-state machines form a third controller-associated multi-state machine having the nine states.

17. An interface apparatus according to claim 14, wherein each of said second interface means implements a first controller-associated multi-state state machine having three states, identified as F-empty, F-active, and F-overrun, cascaded into a fourth multi-state state machine itself having six states identified as T-idle, T-arbitrate, T-source, T-sync, T-wait, and T-busy.

18. An interface apparatus according to claim 17, wherein the first and second controller-associated multi-state machines form a third controller-associated multi-state machine having the eighteen states.

19. An apparatus for interfacing a plurality of controllers compatible with IEEE Std 802.4 (1989) to a single modem compatible with IEEE Std. 802.4 (1989), comprising:
(a) a shared bus, wherein
(i) A first group of signals always propagating from said model to said controllers, and
(ii) a second group of signals always propagating from said controllers both to said modem and to all of said controllers;
(b) first means for interfacing said modem to said shared bus, said first interfacing means implementing a modem-associated multi-state state machine which responds to the signals on said shared bus; and (c) a plurality of second means for interfacing each of said controllers to said shared bus, each of said second interfacing means implementing a controller-associated multi-state state machine which responds to both the signals on said shared bus and the signals originating in said controller, such first and second means jointly ensuring that the signals sequences presented to said modem meet the explicit and implicit requirements of IEEE Std 802.4 for signals presented to a conformant modem, and that the signal sequences presented to said controllers meet the explicit and implicit requirements of IEEE Std 802.4 for signals presented to a conformant controller, provided that the signals originating from said modem and from said controllers themselves meet the explicit and implicit requirements of IEEE Std 802.4 for signals originating from said sources.

20. An apparatus, as in claim 19, in which said modem-associated state machine has two distinct states, identified as transmit and hold.

21. An apparatus, as in claim 19, in which each of said controller-associated multi-state state machines has six distinct states, identified as S-idle, S-arbitrate, S-copy, B-wait, B-arbitrate, and B-pad.

22. An apparatus, as in claim 19, in which said modem-associated state machine has three distinct states, identified as A-idle, A-wait, and A-pass.

23. An apparatus, as in claim 19, in which said controller-associated state machine is a composite of a cascaded first and second state machines, the first state machine having three distinct states, identified as F-empty, F-active, and F-overrun, and the second state machine having three distinct states, identified as T-idle, T-arbitrate, and T-source.

24. An apparatus, as in claim 23, in which said first and second state machine form a third state machine having the nine distinct states.

25. An apparatus, as in claim 19, in which said controller-associated state machine is a composite of a cascaded first and second state machines, the first state machine having three distinct states, identified as F-empty, F-active, and F-overrun, and the second state machine having six distinct states, identified as T-idle, T-arbitrate, T-source, T-sync, T-wait, and T-busy.

26. An apparatus, as in claim 25, in which said first and second machine form a fourth state machine having the eighteen distinct states.

27. An apparatus, as in claim 19, in which said modem is replaced by a timing source and logic means for simulating a modem functioning in a local loopback mode.

28. An apparatus, as in claim 19, wherein said shared bus comprises: signaling paths which are in one-to-one functional correspondence with the signaling paths specified in the standard modem-controller interface of section 10 of IEEE Std 802.4-1989 (otherwise known as the IEEE 802.4G interface).

29. An apparatus as in claim 20, in which each of said controller-associated multi-state machines has six distinct states, identified as S-idle, S-arbitrate, S-copy, B-wait, B-arbitrate, and B-pad.

30. An apparatus as in claim 29, in which said modem is replaced by a timing source and logic means for simulating a modem functioning in a local loopback mode.

31. An apparatus, as in claim 30, wherein said shared bus comprises: signaling paths which are in one-to-one functional correspondence with the signaling paths specified in the standard modem-controller interface of section 10 of IEEE Std 802.4-1989 (otherwise known as the IEEE 802.4G interface.

32. In a communication system, having a first plurality of modems for providing an interface to a communication link, said communication system further having a second plurality of controllers whereby each of said controllers is connected to said plurality of modems via an interface apparatus, and further wherein each of said modem and each of said controllers comply with a predetermined protocol, said interface apparatus comprising:

(a) bus means, for providing a medium to transfer signals between each of said controllers and each of said modem;

(b) a plurality of first interface means each of said first interface means connected to a corresponding modem, and connected to said bus means, for interfacing each of said modems to said bus means, each of said first interface means implementing a modem-associated multi-state state machine which responds to signals on said bus to maintain the predetermined protocol between the corresponding modem and the first interface means;

(c) a plurality of second interface means, each of said second interface means being connected to said bus means and to a corresponding controller, for interfacing each of said plurality of controllers to said bus means, each of said second interface means implementing a controller-associated multi-state state machine which responds to signals on said bus means and further responds to signals from the corresponding controller, each of said second interface means maintaining the predetermined protocol between the second interface means and the corresponding controller; and (d) connecting means, connected to each modem and to each of said second interface means, for providing a common clocking signal to each modem and each of said second interface means.

33. An interface apparatus according to claim 32, wherein each of said first interface means implements a modem-associated multi-state state machine having two states, identified as transmit and hold.

34. An interface apparatus according to claim 33, wherein each of said second interface means implements a controller-associated multi-state state machine having six states, identified as S-idle, S-arbitrate, S-copy, B-wait, B-arbitrate, and B-pad.

35. An interface apparatus according to claim 34, wherein said predetermined protocol is a standard as defined by the IEEE standard 802.4-(1989).

36. An interface apparatus according to claim 32, wherein said first interface means implements a modem-associated multi-state state machine having three states, identified as A-idle, A-wait, and A-pass.

37. An interface apparatus according to claim 36, wherein each of said second interface means implements a first controller-associated multi-state state machine having three states, identified as F-empty, F-active and F-overrun, cascaded into a second multi-state state machine itself having three states, identified as T-idle, T-arbitrate, and T-source.

38. An interface apparatus according to claim 37 wherein the first and second controller-associated multi-state machine form a third controller-associated multi-state machine having the nine states.

39. An interface apparatus according to claim 36, wherein each of said second interface means implements a first controller-associated multi-state state machine having three states, identified as F-empty, F-active, and F-overrun, cascaded into a fourth multi-state state machine itself having six states, identified as T-idle, T-arbitrate, T-source, T-sync, T-wait, and T-busy.

40. An interface apparatus according to claim 39, wherein the first and second controller-associated multi-state machines form a third controller-associated multi-state machine having the eighteen states.

* * * * *